United States Patent [19]

Suzuki

[11] Patent Number: 4,901,827

[45] Date of Patent: Feb. 20, 1990

[54] SLIDE TYPE EXHAUST BRAKE SYSTEM

[75] Inventor: Ryoichi Suzuki, Mishima, Japan

[73] Assignee: Usui Kokusai Sangyo Kaisha Ltd., Sunto, Japan

[21] Appl. No.: 314,643

[22] Filed: Feb. 23, 1989

[30] Foreign Application Priority Data

Mar. 14, 1988 [JP] Japan ................................. 63-58037

[51] Int. Cl.⁴ ............................ F02D 9/06; F16K 3/02
[52] U.S. Cl. ............................... 188/273; 137/630.12; 123/323; 251/84; 251/326
[58] Field of Search ............... 188/273, 154; 123/323; 137/629, 630.12; 251/326, 84, 327

[56] References Cited

U.S. PATENT DOCUMENTS

| | | |
|---|---|---|
| 742,308 | 10/1903 | Gerrard . |
| 795,057 | 7/1905 | O'Brien . |
| 1,436,412 | 11/1922 | Skiffington . |
| 1,620,100 | 3/1927 | Hoxton . |
| 1,752,229 | 3/1930 | Brueckel ............................ 188/273 |
| 2,845,306 | 7/1958 | Carver . |
| 3,342,203 | 9/1967 | Abercrombie . |
| 3,720,227 | 3/1973 | Curran . |
| 4,054,156 | 10/1977 | Benson . |
| 4,062,332 | 12/1977 | Perr . |
| 4,093,046 | 6/1978 | Perr . |
| 4,205,704 | 6/1980 | Benson . |
| 4,408,627 | 10/1983 | Harris . |
| 4,452,269 | 6/1984 | Kindermann . |
| 4,553,648 | 11/1985 | Suzuki et al. . |
| 4,615,354 | 10/1986 | Bianchi . |
| 4,643,226 | 2/1987 | Balz . |
| 4,669,585 | 6/1987 | Harris ................................. 188/273 |
| 4,671,489 | 6/1987 | Jankovic . |
| 4,685,544 | 8/1987 | Takigawa et al. . |
| 4,733,687 | 3/1988 | Takigawa et al. . |
| 4,751,987 | 6/1988 | Takigawa et al. . |
| 4,773,440 | 9/1988 | Yanagawa et al. . |
| 4,819,696 | 4/1989 | Takikawa et al. ............... 188/273 X |
| 4,825,982 | 5/1989 | Yanagawa et al. ............. 188/154 X |

FOREIGN PATENT DOCUMENTS

| | | |
|---|---|---|
| 3009453 | 9/1981 | Fed. Rep. of Germany . |
| 2223602 | 10/1974 | France . |
| 55-117047 | 9/1980 | Japan . |
| 55-119926 | 9/1980 | Japan . |
| 55-123328 | 9/1980 | Japan . |
| 55-123330 | 9/1980 | Japan . |
| 603437 | 9/1985 | Japan . |
| 44095 | 3/1916 | Sweden . |
| 4311 | of 1818 | United Kingdom . |
| 14098 | of 1891 | United Kingdom . |
| 1378497 | 12/1974 | United Kingdom . |

Primary Examiner—Douglas C. Butler
Attorney, Agent, or Firm—Anthony J. Casella; Gerald E. Hespos

[57] ABSTRACT

There is disclosed a slide type exhaust brake system including a housing accommodating a valve member formed with a plurality of exhaust pressure adjusting holes and having its intermediate beam wall formed with an exhaust pressure escape hole, and a piston rod to which an auxiliary valve mechanism composed of a support frame and a liner is locked. The end portions, bent upwards, of the liner are laid along the peripheral wall portions of the frame to prevent the exhaust gas from escaping from the adjusting holes, thereby eliminating an incipient delay in braking. The liner closes the exhaust pressure adjusting holes when closing an exhaust passageway by the valve member which is at the same time thrust forwards. When opening the exhaust passageway, the liner opens the adjusting holes, while the valve member is moved backwards. The liner surface is also formed with at least one through-hole. This arrangement is combined with an effect of enlarged area of the adjusting holes to cause a sufficient drop in exhaust pressure.

5 Claims, 3 Drawing Sheets

PRIOR ART

SLIDE TYPE EXHAUST BRAKE SYSTEM

BACKGROUND OF THE INVENTION

1. Field of the Invention

The present invention is directed to an improvement of an auxiliary valve mechanism in a slide type exhaust brake system, connectively interposed in an exhaust pipe generally in a large-sized vehicle such as a truck, a bus or the like, for imparting braking effects to the vehicle by blockading an exhaust passageway of an exhaust gas flowing through the exhaust pipe when travelling on sharp slopes.

2. Description of the Prior Art

One typical arrangement of a prior art auxiliary valve mechanism nit of exhaust brake system of this type will now be described. As illustrated in FIGS. 4 and 5 (see U.S. patent application Ser. No. 146,841 filed on Jan. 22, 1988, now U.S. Pat. No. 4,819,696). Fitted to the top of a piston rod (26) is an auxiliary valve mechanism consisting of: a support frame (28) mounted on the front surface of a block member (25) engaging with a valve member (23) provided in the vicinity of the top of piston rod (26), the support frame accommodating a tabular liner (29), both lengthwise ends of which are bent upwards to assume a sunk configuration, and sliding on the bottom wall surface of valve member (23). A single piece of exhaust pressure adjusting hole (24) penetrates the surface of valve member (23) incorporated in a reciprocatory passageway provided within a housing of a body. When opening and closing the exhaust passageway, the top of piston rod (26) and the side wall of block member (25) engage with or impact on valve member (23), whereby the valve member is pulled up while being thrust forward and moved backward.

Note that the numeral (30) denotes a small diameter exhaust pressure escape hole, formed in valve member (23), for preventing an excessive load on the machinery in a state where the exhaust passageway is closed.

Based on the prior art auxiliary valve mechanism, however, the following problems will arise. The sunk state of liner (29) loosely fitted to the interior of support frame (28) causes to-and-fro or right-and-left sway as the liner slides on the surface of valve member (23) when opening and closing the exhaust passageway, resulting in the uncertainty of tight fitness. Part of exhaust gas is discharged from escape hole (30) in the case of closing the exhaust passageway, depending on the posture that the exhaust brake system takes when being disposed. In addition, there is created a gap in the sliding surfaces between the liner and closed exhaust pressure adjusting hole (24). Then, the exhaust gas escapes from this gap, which tends to cause an incipient delay in braking and also a loss of braking effects.

Furthermore, the single piece of exhaust pressure adjusting hole (24) does not have a large diameter but has a limit to its dimension in connection with a size of valve member (23) in a confined space. Hence, a sufficient amount of drop in exhaust pressure can not be obtained when opening exhaust pressure adjusting hole (24) in advance of opening the exhaust passageway, thereby exhibiting poor respondency at the valve opening time. A slide range of auxiliary valve mechanism (27) on the surface of valve member (23) tends to increase, with the result that a comparatively lengthy air cylinder unit incorporating a relatively strong spring has to be employed. This brings about an increment in weight of the whole brake system. In some cases there is produced an obstacle to a condition under which the brake system is installed in the confined space.

SUMMARY OF THE INVENTION

It is a primary object of the present invention to provide a slide type exhaust brake system capable of constantly maintaining a tight-fitted condition by eliminating the anxiety for sway in the sliding process, exhibiting sufficient braking effects by preventing the escape of exhaust gas from exhaust pressure adjusting holes especially in a state where an exhaust passageway is closed, effectively producing a drop in exhaust pressure by providing a sufficient area of the exhaust pressure adjusting holes, employing a short and light air cylinder incorporating a relatively weak spring by diminishing a slide range of an auxiliary valve mechanism, and facilitating its installation in a confined space by constructing the whole brake system itself in a compact configuration.

To this end, according to one aspect of the invention, there is provided a slide type exhaust brake system comprising: an exhaust brake body; a tabular valve member having its surface formed with exhaust pressure adjusting holes; a housing including a reciprocatory passageway of the valve member housed in the housing which communicates in a substantially orthogonal direction with an exhaust passageway having its two side ends from which a connecting wall leading to an exhaust pipe is protruded; and an air cylinder unit connectively provided at an upper end of the reciprocatory passageway; a piston rod penetrating a partition wall apart from the air cylinder unit; a fixed block member engaging with the valve member secured to the top of the piston rod; a support frame assuming a C-shape in section and mounted on the front surface of the block member; and a liner loosely fitted to the interior of the support frame, having its two lengthwise ends bent upwards and sliding on the bottom wall surface of the valve member. Based on this construction, an auxiliary valve mechanism, which is composed of the support frame and the liner and also locked to the top of the piston rod, permits the liner to close the exhaust pressure adjusting holes when closing the exhaust passageway by use of the valve member while the valve member is thrust forwards by the top of the piston rod. Then, the liner acts to open the exhaust pressure adjusting holes when opening the exhaust passageway to thereby move the auxiliary valve mechanism backwards while engaging with the valve member. In this arrangement, the front and rear end portions of the liner partly constituting the auxiliary valve mechanism are laid along the front and rear peripheral wall portions of the support member; the plurality of exhaust pressure adjusting holes each penetrating the surface of the valve member are disposed in its movable direction; at least a signle piece of through-hole is formed in the surface of the liner sliding on the bottom wall surface of the valve member; and the individual exhaust pressure adjusting holes are opened with the movement of the liner when opening the exhaust passageway.

In accordance with the thus constructed exhaust brake system of the invention, it is feasible to eliminate the anxiety for to-and-fro or right-and-left sway and constantly provide a smooth operation in a tight-fitted condition when opening and closing the exhaust passageway in any posture that the exhaust brake system takes when being installed by virtue of a structure wherein the end portions of the liner partly constituting the auxiliary valve mechanism are laid along the peripheral wall portions of the support frame, and the liner is shaped to have a sufficient width. Particularly in a state where the exhaust passageway is kept closed, the exhaust gas can be prevented from escaping out of the respective exhaust pressure adjusting holes. The plurality of exhaust pressure adjusting holes cooperate with at least the single through-hole formed in the liner to effectively exhibit a drop in exhaust pressure in combination with a large area of the exhaust pressure adjusting holes when these exhaust pressure adjusting holes are opened with the movement of the liner in advance of opening the exhaust passageway by use of the valve member.

BRIEF DESCRIPTION OF THE DRAWINGS

Other objects and advantages of the invention will become apparent during the following discussion in conjunction with the accompanying drawings, in which.

DETAILED DESCRIPTION OF PREFERRED EMBODIMENTS

Figure 1:
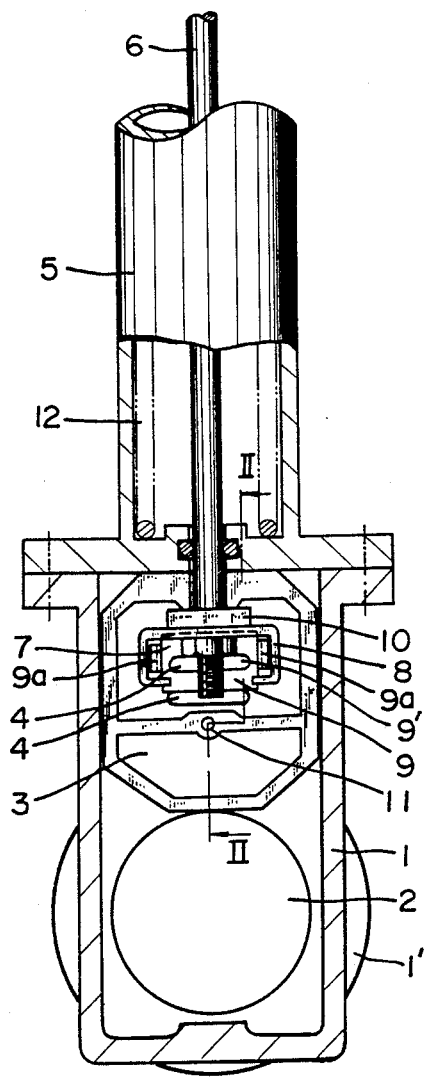
FIG. 1 is a partially cut-away plan view of a lide type exhaust brake system, illustrating one embodiment of the present invention.
Figure 4:
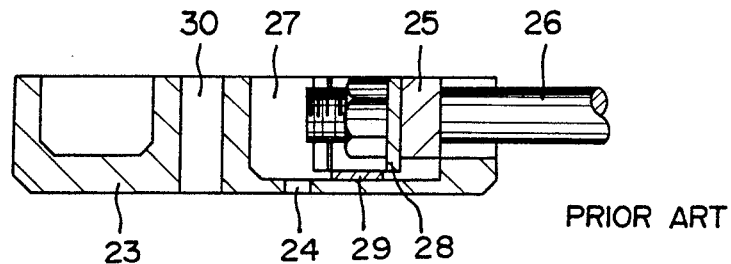
FIG. 4 is an enlarged view, partly in vertical-section, illustrating a prior art valve mechanism in the hole-opening state.
Figure 5:
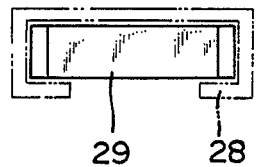
FIG. 5 is a plan view of a single piece of liner of FIG. 4, depicting a sunk state of the liner loosely fitted to the interior of a support frame.
Figure 2:
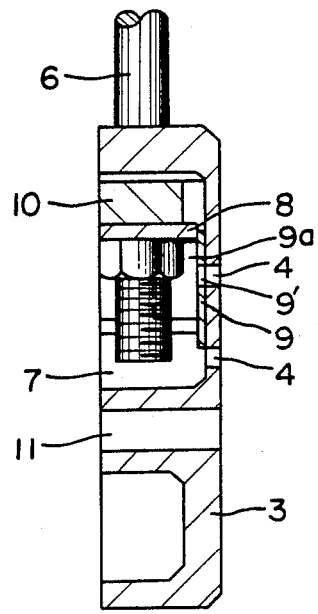
FIG. 2 is an enlarged view, partly in section, taken substantially along the line II—II of FIG. 1, depicting a valve mechanism defined as the principal unit of the present invention in a hole-opening state.
Figure 3:
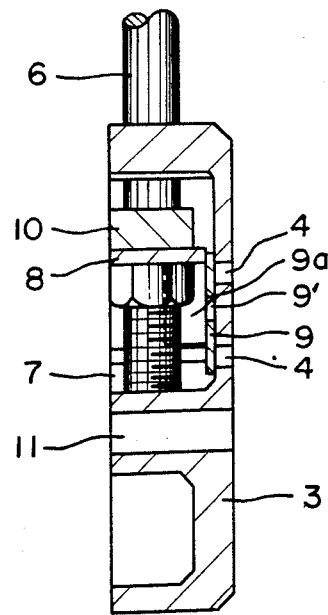
FIG. 3 is a view depicting the valve mechanism shown in FIG. 2 in a hole-closing state.

Turning first to FIGS. 1 to 3, the reference numeral (1) designates a housing of an exhaust brake body. An exhaust passageway (2) includes a connecting wall (1') leading to an exhaust pipe which is protruded from both sides of housing (1). A reciprocatory passageway of a tabular valve member (3) communicates in a substantially orthogonal direction with exhaust passageway (2). Housed in the reciprocatory passageway of the housing is valve member (3) having its surface formed with a plurality of slot-like exhaust pressure holes (4) each passing therethrough and disposed in a movable direction. Valve member (3) is secured to a portion in close proximity to the top of a piston rod (6) penetrating a partition wall apart from an air cylinder unit (5) connectively provided at the upper end of the reciprocatory passageway. Locked to the piston rod is an auxiliary valve mechanism generally designated at (7), auxiliary valve mechanism (7) being composed of: a support frame (8) assuming a substantially C-shape in section and mounted on the front surface of a fixed block member (10) engaging with a securing wall of valve member (3) on the closer side to the top thereof than the foregoing securing portion while being superposed on valve member (3); and a liner (9), both lengthwise ends (9a, 9a) of which are bent upwards, loosely fitted to an interior of the support frame and sliding on the bottom wall surface of valve member (3). Front and rear edge portions of liner (9) are laid along front and rear peripheral wall portions of support frame (8). The surface of the liner is formed with at least a single piece of through-hole (9'). When closing an exhaust passageway (2) by use of valve member (3), liner (9) of auxiliary valve mechanism (7) acts to close all of exhaust pressure adjusting holes (4), while the top of piston rod (6) thrusts valve member (3) forward. When opening exhaust passageway (2), exhaust pressure adjusting holes (4) formed at the end portions are opened as liner (9) moves, and at the same moment the remaining exhaust pressure adjusting holes (4) are aligned with through-holes (9'). Subsequently, all the adjusting holes are unclosed. Block member (10) of auxiliary valve mechanism (7) engages with valve member (3) and moves backwards to pull up the valve member. The numeral (11) represents an exhaust pressure escape hole passing through an intermediate beam wall of valve member (3), this hole being defined as an excessive load prevention hole on the machinery side in a state where exhaust passageway (2) is closed. A coil spring generally indicated at (12) is provided in air cylinder unit (5) and serves to invariably urge a piston (not illustrated) upwards. In accordance with the illustrative embodiment, liner (9) is formed with the single through-hole (9') but may be provided with a plurality of through-holes (9').

As discussed above, the slide type exhaust brake system according to the present invention is capable of exhibiting sufficient braking effects by eliminating an incipient delay in braking owing to a structure adapted to prevent any escape of exhaust gas from the respective exhaust pressure adjusting holes (4) in a constantly tight fitting state in combination with the arrangement of laying liner (9), particularly when closing the exhaust passageway. Besides, the area of the plurality of exhaust pressure adjusting holes (4) is sufficiently large enough to drop the exhaust pressure instantaneously and effectively in combination with the structure for aligning the plurality of holes (4) with at least the single through-hole (9'). Hence, it is possible to obtain quick respondency when opening the valve and diminish a sliding range in auxiliary valve mechanism (7). Simultaneously, air cylinder unit (5) is formed short to accommodate spring (12) having a relatively small force. Air cylinder unit (5), which may decrease in weight, suffices for use. The brake system as a whole can be made compact to facilitate its installation in a confined space. Thus, a remarkably useful slide type exhaust brake system can be provided.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A slide type exhaust brake system comprising:
   an exhaust brake body;
   a tabular valve member having its surface formed with exhaust pressure adjusting holes;
   a housing including a reciprocatory passageway of said valve member housed in said housing which communicates with an exhaust passageway having its two side ends from which a connecting wall leading to an exhaust pipe is protruded;
   an air cylinder unit connectively provided at one side end of said reciprocatory passageway;
   a piston rod penetrating a partition wall apart from said air cylinder unit;

a fixed block member engaging with said valve member secured to the top of said piston rod;

a support frame assuming a C-shape in section and mounted on the front surface of said block member; and a liner accommodated in said support frame, having its two lengthwise ends bent upwards and sliding on the bottom wall surface of said valve member, characterized by an auxiliary valve mechanism composed of said support frame and said liner and locked to said piston rod, said auxiliary valve mechanism permitting said liner to close said exhaust pressure adjusting holes when closing said exhaust passageway by use of said valve member while said valve member is thrust in one direction by the top of said piston rod, and permitting said liner to open said exhaust pressure adjusting holes when opening said exhaust passageway to thereby move said auxiliary valve mechanism in the other direction while engaging with said valve member, wherein said valve member includes said plurality of exhaust pressure adjusting holes disposed in its movable direction, wherein at least one through-hole is formed in said liner sliding on the bottom wall surface of said valve member, and wherein said respective exhaust pressure adjusting holes are opened with the movement of said liner when opening said exhaust passageway.

2. The system as set forth in claim 1, wherein said liner has its front and rear end portions laid along front and rear peripheral wall portions of said support frame.

3. The system as set forth in claim 1, wherein said exhaust pressure adjusting holes and said through-hole are each defined as a slot.

4. The system as set forth in claim 1, wherein said liner has its two lengthwise ends bent upwards.

5. The system as set forth in claim 1, wherein said valve member includes an intermediate beam wall through which an exhaust pressure escape hole passes.

* * * * *